United States Patent Office 3,456,297
Patented July 22, 1969

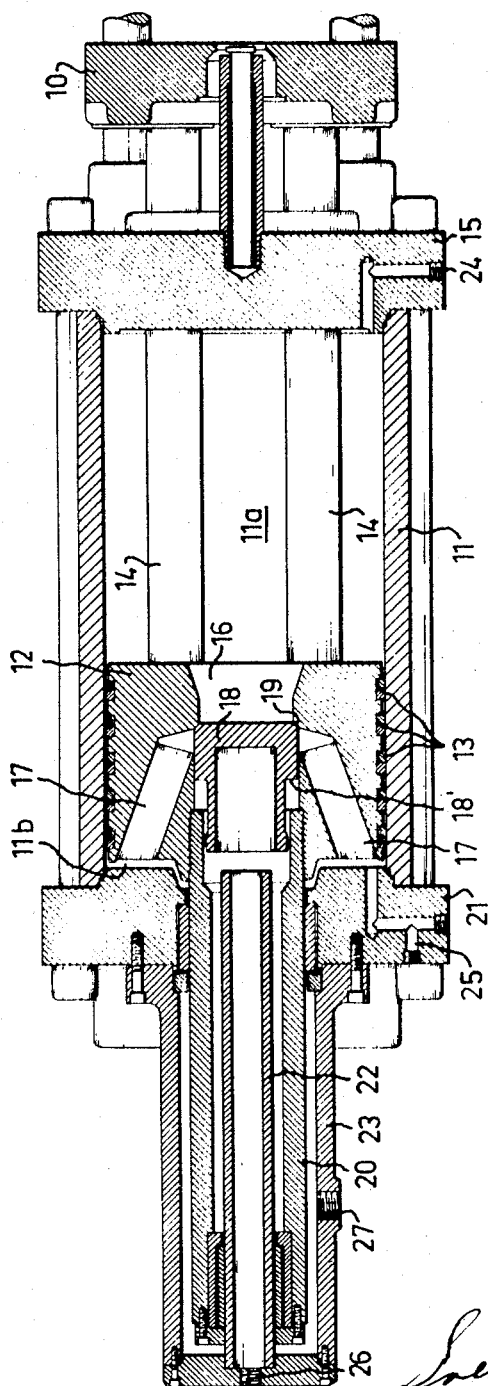

3,456,297
HYDRAULIC MOULD LOCKING DEVICES
Sven Åke Andréasson, Halsingborg, Sweden, assignor to Broderna Akessons Maskenfabrik AB, Halsingborg, Sweden
Filed June 13, 1966, Ser. No. 557,084
Claims priority, application Sweden, June 22, 1965, 8,219/65
Int. Cl. B29f 1/06
U.S. Cl. 18—30         4 Claims

ABSTRACT OF THE DISCLOSURE

A hydraulic mould locking device wherein the piston has a communication between the cylinder spaces on either side of the piston and valve means opening to excess pressure on the piston side facing the movable mould member and closing against excess pressure on the opposite piston side. The piston on the last-mentioned side is displaceably guided with a tubular piston rod on a pipe for supplying and discharging hydraulic fluid to and from the interior of the tubular piston rod. The effective piston pressure area on the side facing the movable mould member is larger than the annular effective pressure area around the tubular piston rod on the opposite side of the piston, but smaller than the total effective pressure area on this side. The hydraulic mould locking device eliminates the usual gravity tank, suction line and pressure booster.

---

This invention relates to a hydraulic mould locking device, especially for injection moulding machines, comprising a hydraulic cylinder with an axially movable piston connected on one side by means of a piston rod to the movable mould member, and having inlet and outlet means for the hydraulic fluid on either side of the piston.

In hydraulic mould locking devices of this type, it is desired to produce rapid movement of the movable mould member when the mould is closed and opened. To this end, there is often used in conventional hydraulic mould locking devices a gravity tank for replenishing the hydraulic cylinder during high speed operation when the mould is closed and for accommodating the hydraulic fluid displaced from the hydraulic cylinder in high speed operation when the mould is opened. This gravity tank is usually placed on top of the hydraulic cylinder, which makes the mould locking device complicated, and in addition there is the necessity of providing replenishing valves and similar equipment. Where no gravity tank is used, a separate suction line for self-suction of oil to the hydraulic cylinder in high speed operation is installed. If the system is to function satisfactorily, the suction line and its valve equipment must have unusually large dimensions. Moreover, there is the risk of a vacuum arising in the system, especially if the gaskets in the hydraulic cylinder become worn.

As a rule, conventional hydraulic mould locking devices employ a booster for multiplying the pressure of the hydraulic fluid supplied by the pump to the hydraulic cylinder so that it will be from two to four times greater than the pump pressure. This boosting of the pump pressure takes some time and therefore results in the operating cycle of the mould locking device being delayed. The booster also makes the mould locking device more expensive, and the reason why it is nevertheless still used in conventional mould locking devices is that the pressure boosting is required for operating the heavy movable assembly of such mould locking devices.

The present invention aims at overcoming the complications associated with the above described arrangements in conventional hydraulic mould locking devices. According to the invention, this is accomplished in a hydraulic mould locking device of the above-mentioned type by providing in the piston a communication between the cylinder spaces on either side of the piston and valve means opening to excess pressure on the piston side facing the movable mould member and closing against excess pressure on the opposite piston side, and by arranging for the piston on said last-mentioned side to be displaceably guided with a tubular piston rod on a pipe for supplying and discharging hydraulic fluid to and from the interior of said tubular piston rod, the effective piston pressure area on the side facing the movable mould member being larger than the annular effective pressure area around the tubular piston rod on the opposite side of the piston, but smaller than the total effective pressure area on this side.

In a hydraulic mould locking device of this design, gravity tank, suction line and pressure booster can thus be entirely dispensed with. In addition, further essential advantages are gained, especially in regard to the seal between piston and cylinder which in present mould locking devices is a frequent source of operational breakdowns. The gaskets usually inserted between piston and cylinder are easily worn and must frequently be replaced. To this end, it is necessary to remove the entire hydraulic cylinder and, as a rule, also the entire assembly moving therein. This is difficult work, especially when the mould locking device is designed for high mould locking pressures where the components are always very heavy. In most instances, the person using the mould locking device does not have available the necessary expedients to change the gaskets himself, and this further complicates the exchange of gaskets.

To explain the invention both in regard to its construction and function, and also the advantages gained thereby, a preferred embodiment thereof will be described more in detail in the following, reference being had to the accompanying drawing illustrating an axial section of a mould locking device according to the invention.

The mould locking device is adapted to operate a movable tool plate 10, for instance in an injection moulding machine, and comprises a hydraulic cylinder 11 having an axially movable piston 12 therein which is sealed against the inner side of the cylinder by conventional compression piston rings 13, which is a novel feature in connection with mould locking devices and conditioned by the specific function of the mould locking device of this invention. Instead of having in the usual manner a single large and heavy piston rod, the piston 12 has four symmetrically arranged slender piston rods 14 (advancing pistons) extending through stuffing boxes accessible from outside and provided in the right-hand end cover 15 of the hydraulic cylinder and connected to the movable tool plate 10. In the piston, there is provided a central bore 16 from which bores 17 branch out between opposite sides of the piston for establishing communication between the hydraulic cylinder spaces 11a and 11b located on either side of the piston. The communication through the piston is controlled by non-return valve means 18 displaceably guided in the central bore 16 of the piston and controlling the communication between the bore 16 and the bores 17, in cooperation with a seat 19 provided in the bore 16. The non-return valve means 18 is adapted to be lifted from the seat 19 upon excess pressure on the right-hand piston side and to be urged into closing position against said seat upon excess pressure on the left-hand side of said piston.

In the piston, there is secured within the bore 16 a tubular piston rod 20 in which the non-return valve means 18 is displaceably guided with a narrow portion, an external shoulder 18' on said non-return valve means being adapted to restrict, by abutting against the end of the piston rod 20, the movement of said non-return valve means away from the seat 19. The tubular piston rod 20 is sealingly guided in the left-hand end cover 21 of the hydraulic cylinder 10 and on a pipe 22 which is supported coaxially with the hydraulic cylinder by means of a sleeve 23 secured on said end cover 21, the movable piston rod being displaceable within the annular space between the pipe 22 and the sleeve 23. The end cover 15 has a passage 24 for supplying and discharging hydraulic fluid to and from the cylinder space 11a, and the cover 21 has a passage 25 for supplying and discharging hydraulic fluid to and from the cylinder space 11b. Moreover, there is provided in the sleeve 23 a passage 26 for supplying and discharging hydraulic fluid to and from the pipe 22, and a bleed opening 27 for bleeding off hydraulic fluid that may have leaked into the sleeve 23 from the pipe 22 or from the cylinder space 11b. The passages 24, 25 and 26 may be optionally closed, connected to a pump for the supply of hydraulic fluid, or connected to a pressureless tank for hydraulic fluid by means of a control valve installation (not shown).

According to the invention, the diameters of the piston 12, the piston rods 14, the tubular piston rod 20 and the supply pipe 22 are so dimensioned that the effective piston pressure area facing the cylinder space 11a (the total area of the piston 12 minus the total area of the piston rods 14) is smaller than the effective pressure area facing the cylinder space 11b and the interior of the tubular piston rod 20 (the annular area of the piston 12 around the tubular piston rod 20 plus the circular area corresponding to the outer diameter of the pipe 22) but greater than the effective pressure area facing only the cylinder space 11b (the annular piston area around the tubular piston rod 20).

The mould locking device so constructed operates as follows:

The mould is assumed to be open so that the different parts of the mould locking device occupy the positions illustrated in the drawing and the two cylinder spaces 11a and 11b are filled with hydraulic liquid, and the mould is to be closed by displacing the movable tool plate 10 to the right in the drawing. During the closing operation, the passage 24 is held closed and the passages 25 and 26 are supplied with hydraulic fluid under pressure from the pump. Because the effective pressure area exposd to the pump pressure in the cylinder space 11b and the tubular piston rod 20 is greater on the left-hand side of the piston 12 than the effective pressure area on the right-hand side of the piston, there arises in the cylinder space 11a an excess pressure causing the non-return valve means 18 to be displaced to the left away from the seat 19 so that the hydraulic fluid ahead of the piston 12 in the cylinder space 11a will flow through the bores 16, 17 past the non-return valve means 18 into the cylinder space 11b which is filled both with the hydraulic fluid thus passing through the piston and, during the displacement of the piston 13 to the right, with the hydraulic fluid supplied through the passage 25. By making the difference between the effective pressure areas of the two opposite sides of the piston 12 small, the piston will travel rapidly in the cylinder. Thus, the cylinder space 11b is filled partly internally in the cylinder, and no additional supply of hydraulic fluid (gravity tank, suction line) for achieving rapid movement is necessary.

If it is desired, in a certain displaced positon of the piston 12, to impart a slower movement to the piston, the communication between the cylinder space 11a and the hydraulic fluid tank through the passage 24 is opened so that the pressure in the cylinder space 11a is relieved to the hydraulic fluid tank, resulting in the non-return valve means 18 being urged against its seat 19 under the action of the pump pressure in the tubular piston rod 20. The hydraulic fluid supplied through the passages 25 and 26 exerts a full mould locking pressure on the effective pressure area on the left-hand side of the piston 12 as soon as the tool plate 10 encounters a resistance.

For reopening the mould, the passage 24 is supplied by the pump with hydraulic fluid under pressure, whilst the passage 25 is held closed and the passage 26 is in communication with the hydraulic fluid tank. The effective pressure area on the right-hand side of the piston 12 being greater than the annular effective pressure area around the tubular piston rod 20 and facing the cylinder space 11b (in this instance the effective pressure area facing the interior of the piston rod 20 is left out of account since the interior of the tubular piston rod is relieved towards the hydraulic fluid tank so that the pressure therein is zeroised), an excess pressure will arise in the cylinder space 11b. The pressure in the cylinder space 11a being unrestricted to displace the non-return valve means 18 from its seat 19 when the counterpressure on the left-hand side of the non-return valve means is practically zero, hydraulic fluid will thus flow from the cylinder space 11b through the passages 16, 17 past the non-return valve means 18 into the cylinder space 11a as the piston 12 travels to the left. The difference between the said effective pressure areas being kept small, the piston travels rapidly. This movement can be made still slower by throttling the communication from the interior of the tubular piston rod 20 through the passage 26 to the hydraulic fluid tank, whereby the non-return valve means 18 is displaced closer to its seat 19 because of the counterpressure in the interior of the tubular piston rod 20. The mould opening movement ceases entirely upon interruption of the hydraulic fluid supply through the passage 24.

In conventional hydraulic mould locking devices, the disengagement force at the moment of opening is limited and depends on the rate of travel of the piston, the force decreasing with an increase in that rate. In consequence hereof, the opening force in conventional mould locking devices may be insufficient because a high piston speed is desired which will lead to a reduction of the said force. This inconvenience has been entirely eliminated in the mould locking device of the invention since, in principle, the opening force can be equal to the closing force, while at the same time retaining the high speed of the opening movement.

A considerable advantage of the hydraulic mould locking device of the invention is that the piston 12 has no gaskets and instead has simple compression piston rings 13, the life of which is ten times as long as conventionally provided gaskets, and these rings eliminate the necessity of burnishing the interior of the cylinder 11, as is at present always the case in conventional hydraulic mould locking devices. The necessary gaskets are mounted externally of the cylinder cover 15 around the piston rods 14 where they can easily be exchanged without dismantling the cylinder proper. Because several slender piston rods 14 can be provided instead of a single, heavy, burnished and in many cases also hard-chromium plated piston rod, as in conventional mould locking devices, an exchange of gaskets is an inexpensive operation. By eliminating the conventional heavy piston rod between the piston and the tool plate, it has also been possible to considerably reduce the acceleration forces of conventional mould locking devices. The acceleration time will be shorter, and the mould locking device thus operates more quickly, without requiring the use of a booster.

Naturally, the invention is not limited to the embodiment illustrated and described but can be modified within the scope of the appended claims.

What I claim and desire to secure by Letters Patent is:

1. A mould locking device for an injection moulding machine having a movable mould member, comprising a hydraulic cylinder, a piston axially movable in said cylinder, at least one piston rod connecting said piston on one side thereof with said movable mould member, hydraulic fluid inlet and outlet means for said hydraulic cylinder on either side of said piston, means forming in said piston a communication between the cylinder spaces on either side of the piston, valve means opening said communication to excess pressure on said one side of the piston, facing the movable mould member, and closing said communication against excess pressure on the opposite side of the piston, and means displaceably guiding said piston on said last-mentioned side thereof and comprising a tubular piston rod and a stationary pipe for supplying and discharging hydraulic fluid to and from the interior of said tubular piston rod, said pipe being encompassed by said tubular piston rod which is slidably guided on said pipe, the effective pressure area formed by said piston on said one side facing the movable mould member being larger than the annular effective pressure area formed by said piston around the tubular piston rod on said opposite side of the piston, but smaller than the total effective pressure area for fluid pressure acting on said piston on said latter side thereof.

2. A mould locking device as claimed in claim 1, wherein said valve means comprises a non-return valve member displaceably provided in a central bore formed by said piston, and a seat formed by said piston in said bore and cooperating with said piston, said bore communicating on one side of said non-return valve member with the cylinder space on said one side of the piston facing said movable mould member and on the other side of said non-return valve member with the interior of said tubular piston rod.

3. A mould locking device as claimed in claim 2, wherein said piston forms branch bores emanating from said central bore and opening into the cylinder space on said opposite side of the piston, said non-return valve member controlling the communication between said central bore on said side of the non-return valve member facing said movable mould member.

4. A mould locking device as claimed in claim 3, wherein several piston rods are provided symmetrically around said central bore on said one side of the piston facing said movable mould member.

References Cited

UNITED STATES PATENTS

| | | | |
|---|---|---|---|
| 2,664,859 | 1/1954 | Green | 92—108 X |
| 3,068,841 | 12/1962 | Robbins et al. | 91—447 X |
| 2,780,836 | 2/1957 | Morin | 18—30 |
| 3,084,512 | 4/1963 | Huelskamp | 18—30 |

FOREIGN PATENTS

| | | |
|---|---|---|
| 1,016,636 | 10/1957 | France. |
| 665,494 | 6/1963 | Canada. |

WILBUR L. McBAY, Primary Examiner

U.S. Cl. X.R.

18—16; 91—216; 92—108; 100—269; 164—339